RELEASABLE FASTENING DEVICES

Filed June 17, 1957 7 Sheets-Sheet 1

INVENTORS
VICTOR CHANARYN
DANIEL NORMAN WALKER
BY Irwin S. Thompson
ATTORNEY

RELEASABLE FASTENING DEVICES

Filed June 17, 1957 7 Sheets-Sheet 2

INVENTORS
VICTOR CHANARYN
DANIEL NORMAN WALKER
BY Irwin S. Thompson
ATTORNEY

RELEASABLE FASTENING DEVICES

Filed June 17, 1957 7 Sheets-Sheet 3

INVENTORS
VICTOR CHANARYN
DANIEL NORMAN WALKER
BY Irwin S. Thompson
ATTORNEY

Oct. 3, 1961 V. CHANARYN ET AL 3,002,369

RELEASABLE FASTENING DEVICES

Filed June 17, 1957 7 Sheets-Sheet 4

INVENTORS
VICTOR CHANARYN
DANIEL NORMAN WALKER
BY Irwin S. Thompson
ATTORNEY.

INVENTORS
VICTOR CHANARYN
DANIEL NORMAN WALKER
BY Irwin S. Thompson
ATTORNEY

Oct. 3, 1961 V. CHANARYN ET AL 3,002,369

RELEASABLE FASTENING DEVICES

Filed June 17, 1957 7 Sheets-Sheet 6

INVENTORS
VICTOR CHANARYN
DANIEL NORMAN WALKER
BY Irvin S. Thompson
ATTORNEY

RELEASABLE FASTENING DEVICES

Filed June 17, 1957 7 Sheets-Sheet 7

INVENTORS
VICTOR CHANARYN
DANIEL NORMAN WALKER
BY Irwin S. Thompson
ATTORNEY 3,002,369

RELEASABLE FASTENING DEVICES

Victor Chanaryn and Daniel Norman Walker, Birmingham, England, assignors to Wilmot-Breeden Limited, Birmingham, England Filed June 17, 1957, Ser. No. 666,131
Claims priority, application Great Britain June 22, 1956
20 Claims. (Cl. 70—149)

Figure 1:
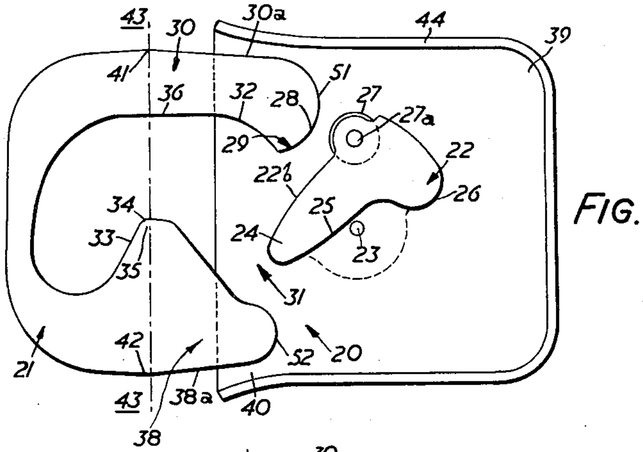

This invention relates to releasable fastening devices, more especially for doors, and has particular though not exclusive reference to vehicle door fastenings.

Motor vehicle door fastenings have to comply with a variety of different requirements apart from merely preventing the doors from inadvertently opening. Thus it is a requirement in modern saloon body construction that the doors when closed into the door openings should adequately reinforce the body structure in order to ensure its structural stability. For this reason other specific restraints between the door and the body of the vehicle, in addition to the restraint against the door opening, have to be exerted by the door fastening. These are notably restraint against upward and downward movement of the doors relatively to the body. Restraint against unlimited further inward movement, or "overtravel," of the doors beyond their closed positions may be provided by the body.

Overtravel occurs when a car door is slammed before being returned due to the resilience of the peripheral door seals and the elastic deformation of both body and door, and it is very desirable that motor vehicle door fastenings should be able to tolerate a considerable amount of overtravel, while nevertheless requiring very little overtravel in order to perform the door-fastening operation. This operation has to be effected very rapidly, i.e. during the fraction of a second occupied by the door in completing the last inch or thereabouts of its inward travel. Moreover the door fastenings must be readily releasable despite the pressure due to the peripheral seals which is acting constantly outwards and results in quite a large outward force at the latch point.

Due to the numerous requirements which they have to satisfy, and to the arduous conditions under which they operate, motor vehicle door fastenings as at present constructed are complex mechanisms, comprising not only the outside or visible interengaging elements fixed on to the door pillar and body pillar of the vehicle but also inside locking mechanism, i.e., components hidden from view within the panelling. This inside locking mechanism, usually including a pawl and ratchet, constitutes the lock mechanism proper of the door fastening as it controls the locking and release of the outside interengaging elements, and for this purpose such inside locking mechanism has associated with it means by which locking and release of the fastening may be effected either directly, for example from outside the vehicle, and also by remote control, for example from inside the vehicle.

The present invention provides a releasable fastening device which, while capable of use in fastening, latching or coupling applications generally, lends itself to construction as a motor vehicle door fastening having fewer parts than the known devices currently employed for fastening vehicle doors, and therefore which will be more simple and economical in production than the known devices.

According to the invention the releasable fastening device comprises two parts between which relative translatory movement and angular movement occurs during the fastening operation, said translatory movement occurring in a plane substantially normal to the axis of said angular movement, surface portions of said parts coacting during said relative translatory movement to generate a condition of moment on, and cause angular movement of, the one part relatively to the other to a coupling position, the evolution of said surface portions being such that said angular movement is irreversible, due to a condition of substantially no-moment on the angularly movable part occurring, when it has proceeded beyond a certain point, by relative translatory movement between the parts in the reverse direction.

The said parts preferably comprise a cam and a keeper, said cam being received in a cavity or space between portions of said keeper during said relative translatory movement to cause relative angular movement between the cam and keeper into a coupling position.

Due to the invention, as applied to a vehicle door fastening, the inside locking mechanism normally provided in such fastenings is rendered unnecessary, means merely being required for releasing the self-locking cam and keeper directly and by remote control.

Preferably the relative translatory movement between the said parts occurs due to translatory movement of the angularly movable part while the other part remains stationary both in the translatory and angular sense. Although in certain cases the keeper may be the angularly movable part, it is preferred to arrange the cam for angular movement, the keeper being maintained stationary at least in the angular sense.

The arrangement is preferably such that, with the two parts in their coupling position, any tendency for relative translatory movement between the parts in said reverse direction applies substantially no torque to said angularly movable part. This may be achieved by arranging that the two parts contact each other substantially at the centre about which the angular movement occurs, so that the force between the two parts passes substantially through said centre.

Although the keeper may comprise merely two spaced surface portions one of which coacts with the cam during initial contact with the latter, to produce relative angular movement between the cam and the keeper so that the former is guided into the space between said portions, while the other is subsequently engaged by the cam to provide a "safety lock" condition, when full lock engagement of the parts is not achieved, preferably said surface portions form parts of a continuous surface of the keeper which is shaped substantially in the form of a G.

Figure 4:
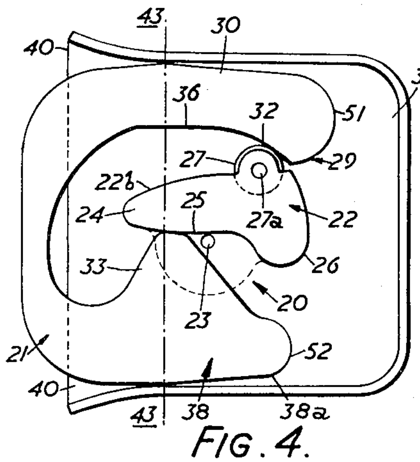
Figure 5:
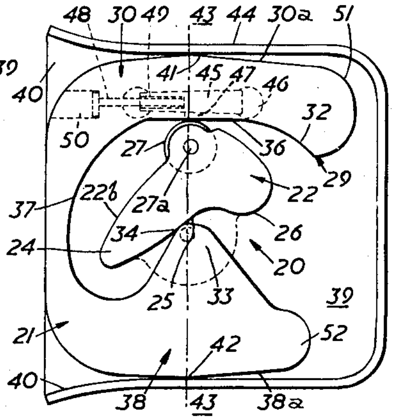
Figure 6:
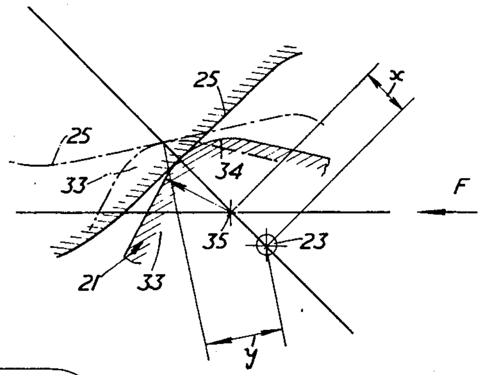
Figure 7:
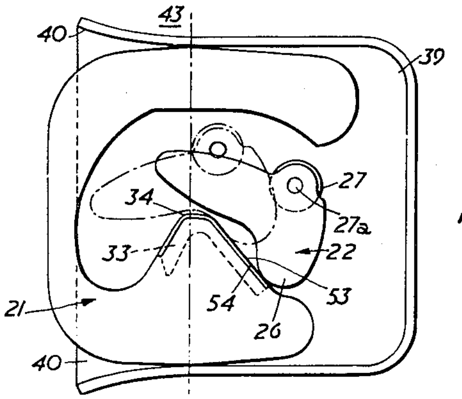
Figure 8:
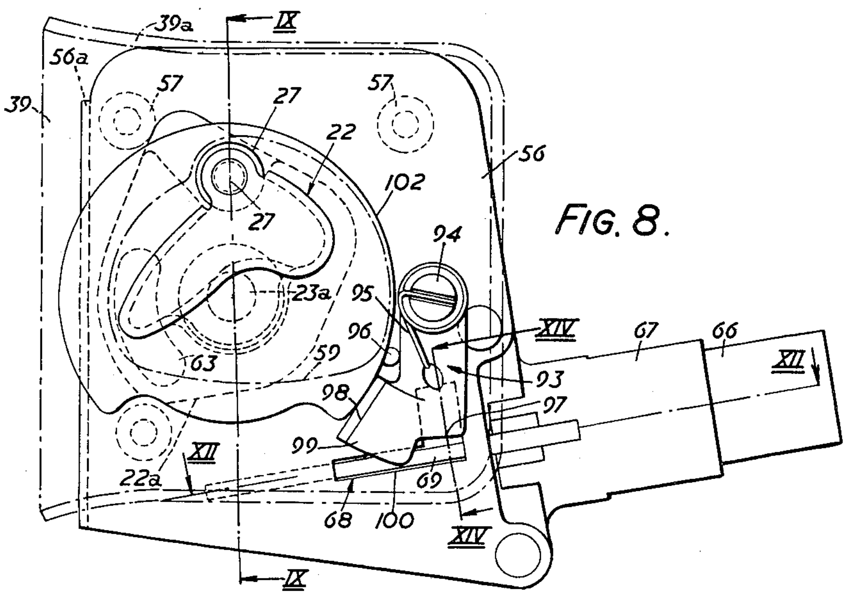
Figure 9:
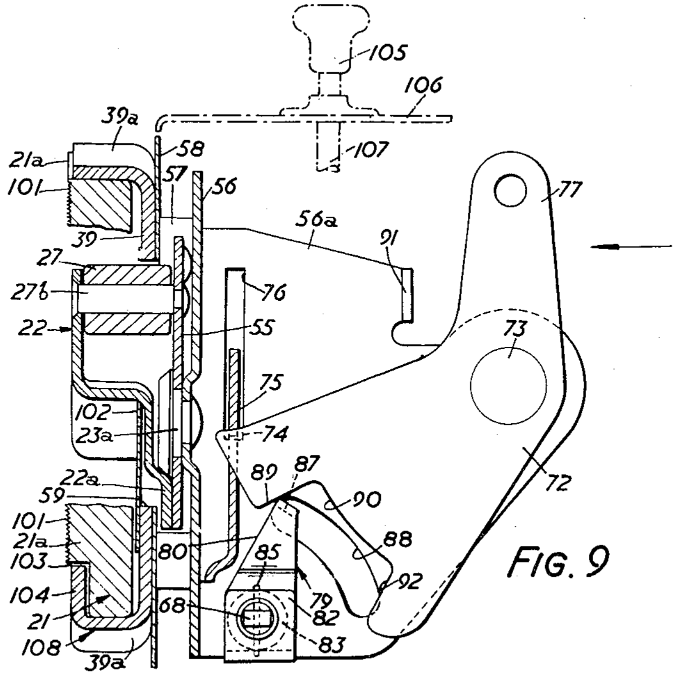
Figure 10:
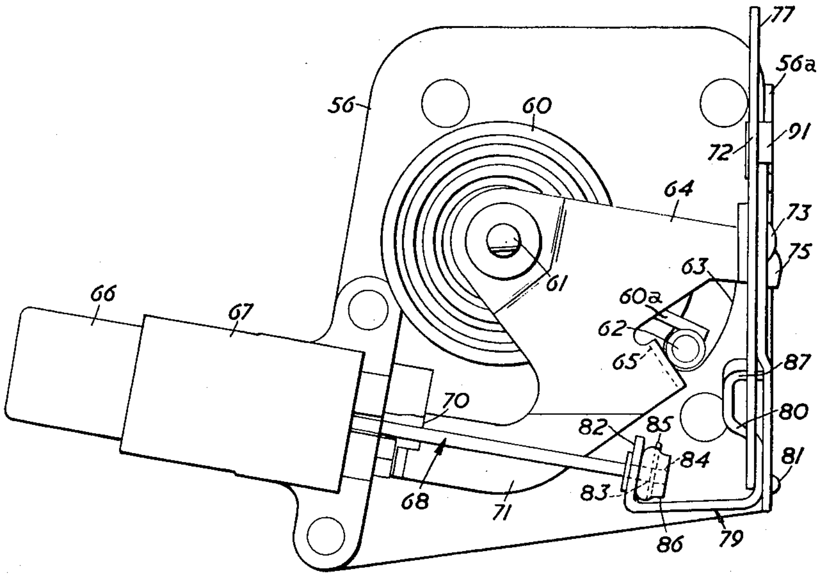
Figure 11:
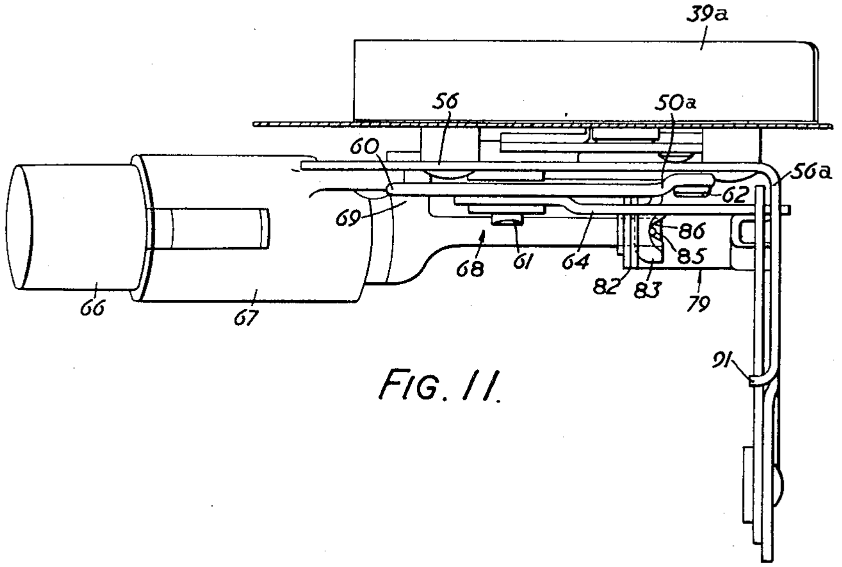
Figures 12, 13:
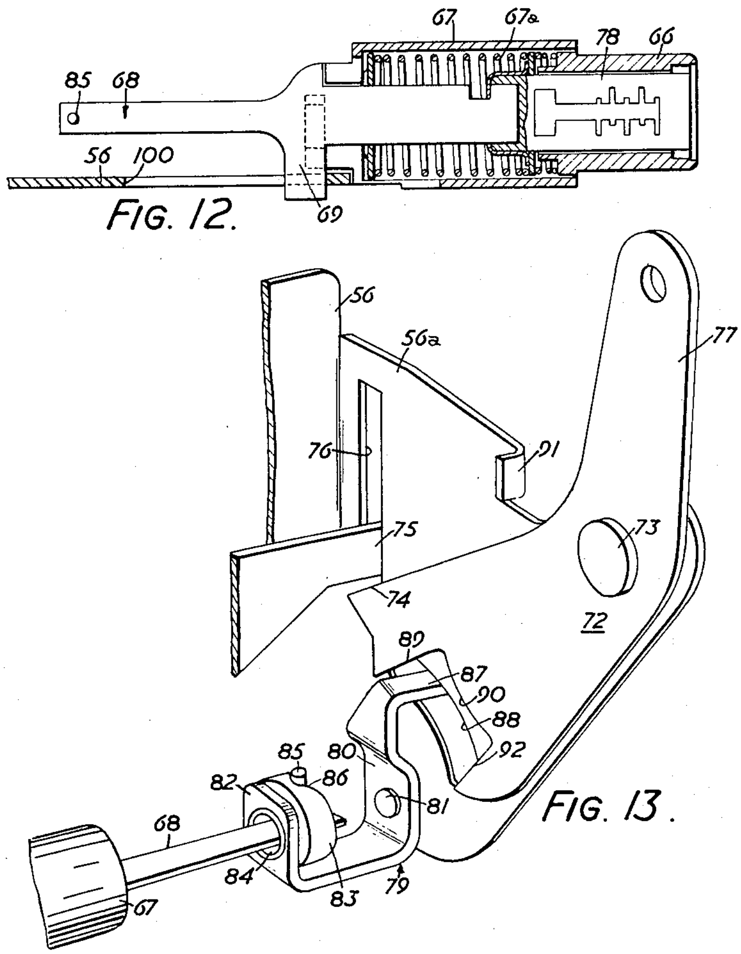
Figures 14, 15:
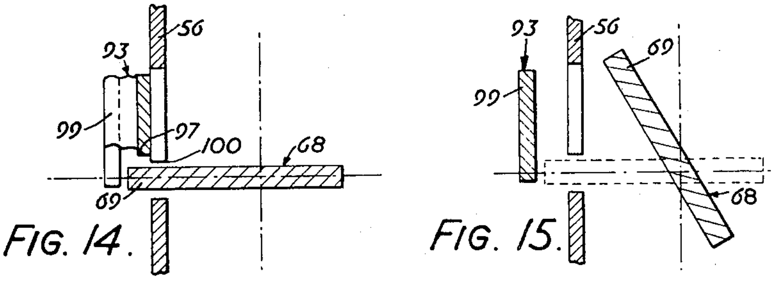
Figures 16, 17:
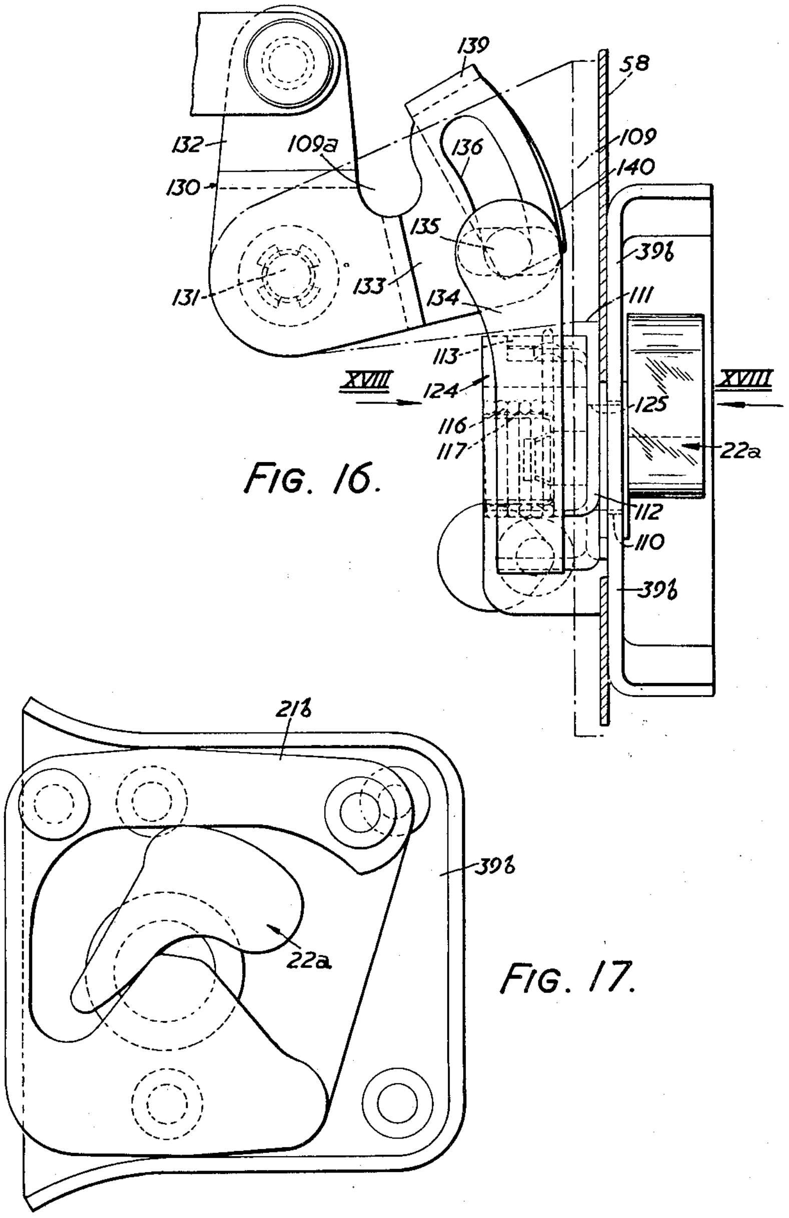
Figure 18:
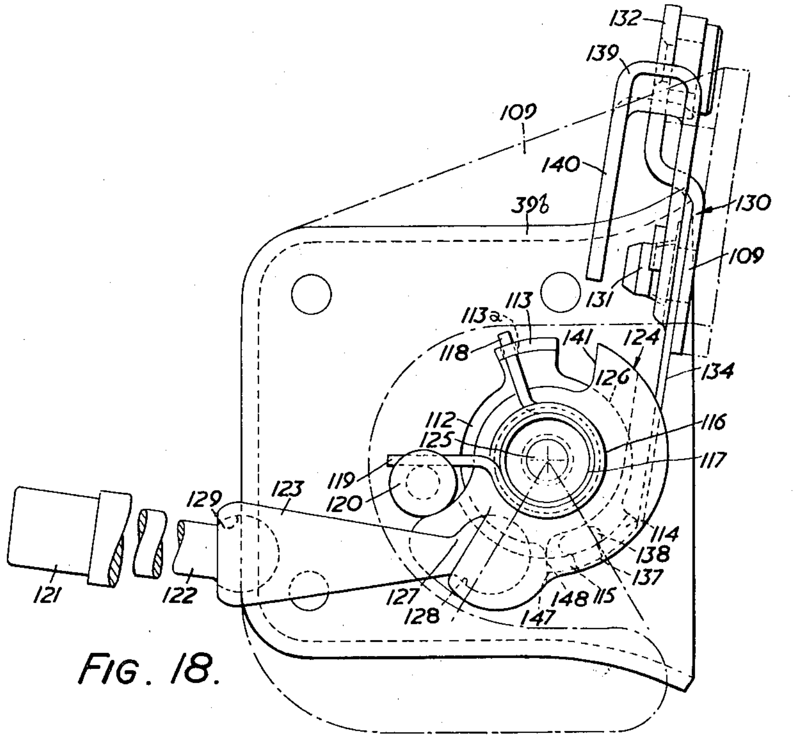
Figure 19:
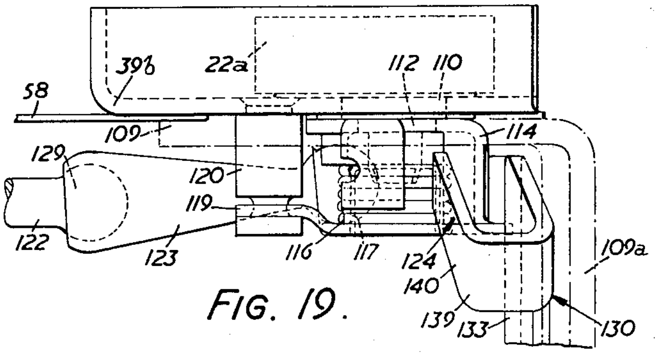

Two forms of motor vehicle door fastenings in accordance with the invention will now be described, by way of example, with reference to the accompanying drawings, in which:

FIGURES 1 to 5 diagrammatically illustrate the progressive stages by which an angularly movable part of the fastening engages with a stationary part during closing movement of the vehicle door, FIGURE 6 is a detail view on a larger scale of a radiused portion of the stationary part of the fastening and the portion of the angularly movable part that makes contact therewith, FIGURE 7 illustrates the means by which the angularly movable part is positively moved into its coupling position, under relative translatory movement of the parts, in the event of failure of spring loading means provided for this purpose, FIGURE 8 illustrates in greater detail and on a larger scale one form of fastening device embodying the principle illustrated in FIGURES 1 to 7, the figure being an elevational view of the part of the fastening device which is secured to the door pillar of the vehicle, FIGURE 9 is a part-sectional view of the part of the fastening device shown in FIGURE 8 on the line IX—IX of that figure, FIGURE 10 is a view of the fastening device in the direction of the arrow in FIGURE 9, FIGURE 11 is a plan view of the part of the fastening device shown in FIGURES 8 to 10, FIGURE 12 is a detail sectional view on the line XII—XII of FIGURE 8, FIGURE 13 is a broken perspective view to illustrate in greater detail parts shown in FIGURE 9, FIGURE 14 is a detail sectional view on the line XIV—XIV of FIGURE 8, while FIGURE 15 illustrates the same parts in a different position, FIGURE 16 is an end view of a second form of fastening device constituting an alternative and simplified embodiment of the invention, FIGURE 17 illustrates the cam, guide plate and keeper of the fastening device shown in FIGURE 16 in the direction of the arrow XVII in that figure, FIGURE 18 illustrates the fastening device shown in FIGURE 16 in the direction of the arrow XVIII in that figure, and FIGURE 19 is a plan view of the fastening device illustrated in FIGURES 16 to 18.

Referring to FIGURES 1 to 5 of the drawings, the fastening device 20 diagrammatically illustrated therein comprises a stationary part in the form of a keeper 21 of substantially G shape which is fixed to the body pillar of the vehicle and an angularly movable part or cam 22 carried by the door pillar. The cam 22 is angularly movable about a centre 23, fixed in relation to the door pillar, and is of substantially segmental shape with respect to the centre about which it is mounted. A rounded leading end 24 of the cam merges smoothly into a substantially flat chordal surface 25 which coacts with the keeper 21 to couple the cam and keeper to each other. Towards its trailing end the cam 22 has a lobe providing a pivot mounting for a roller 27 and protruding from its generally arcuate surface **22*b*, a further lobe 26 also projecting from the flat chordal surface 25 at the trailing end of the latter. The purpose of the roller 27 is to reduce friction between the keeper 21** and the cam in certain positions of the latter as will hereinafter be explained.

Figure 2:
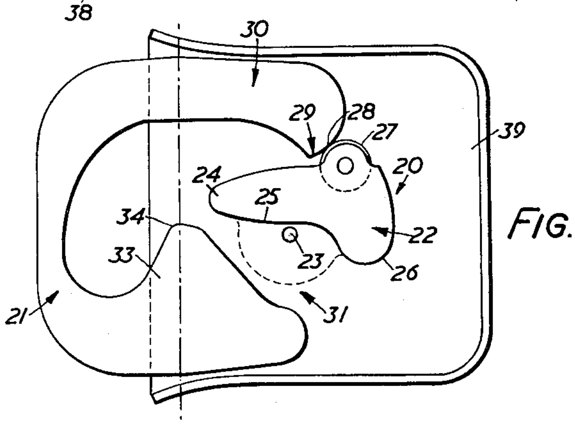
Figure 3:
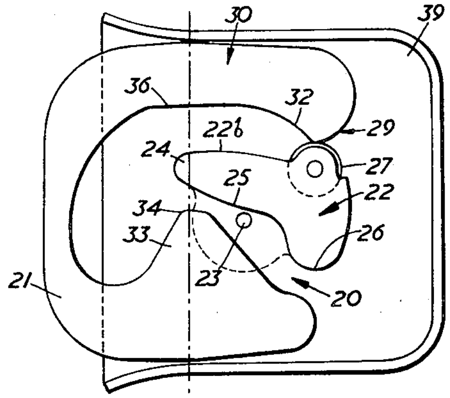

The keeper 21 and cam 22 are mounted on the body and door pillars respectively so that the G shape of the keeper is in an upright position and the cam has its flat chordal surface 25 disposed downwardly, the cam being movable between positions in which such surface is substantially horizontal, as shown in FIGURES 2, 3 and 4, and at about 45° to the horizontal with its leading end 24 down, as shown in FIGURES 1 and 5. This latter position is the coupling position of the cam 22 which is constantly spring loaded in an anti-clockwise direction tending to turn it into such position.

FIGURE 1 illustrates the keeper 21 and cam 22 disengaged from each other with the cam approaching the keeper as the door moves towards its closed position. Upon further inward movement of the door pillar the roller 27 makes initial contact with a rounded outer surface 28 of an inward bulge 29 on the upper jaw 30 at the open end of the keeper 21, as shown in FIGURE 2, to produce angular movement of the cam 22 in a clockwise direction about its centre 23 against the spring loading in order to guide the leading end 24 of the cam into the mouth 31 of the G shape of the keeper and lift the leading end 24 of the cam clear of the tail 33 of the G shape. The roller 27 on the cam 22 also provides a condition of "safety lock" when the door is slammed with insufficient force to effect complete locking of the parts but sufficiently to cause the roller to pass below the lower edge of the inward bulge 29, as shown in FIGURE 3, to the safety lock position shown in FIGURE 4. In this position the cam 22 resists egress from the keeper 21, under a tendency to reopening of the door, by engagement of the roller 27 with the inner portion 32 of the inward bulge 29 while the cam rests on the tail 33 of the G shape with its flat chordal surface 25 at a point forwardly of its centre of angular movement 23.

Upon further inward movement of the cam 22 beyond the aforesaid condition of "safety lock," it will be understood that the roller 27 moves clear of the inner portion 32 of the inward bulge 29, against which it has been resting, simultaneously with the centre of angular movement 23 of the cam substantially coinciding with the point of contact of the cam with the tail 33 of the G shape, in which position the cam is free to turn under the action of its spring loading into its coupling or fully locked position shown in FIGURE 5. In order to avoid a point contact, and therefore excessive wear, between the flat chordal surface 25 of the cam 22 and the tail 33 of the G shape of the keeper 21, when the cam is in its coupling position, the upper inner surface of the tail has a radiused portion 34 over which the flat chordal surface rolls as the cam moves into its coupling position. If angular irreversibility of the cam is to be provided in all positions of the cam 22 after the latter has started to turn about its centre of rotation 23 towards the coupling position, said centre of rotation and the axis of the radiused portion 34 of the keeper 21 should be coincident. However such an arrangement leads to a rapidly increasing load on the bearing at the centre of rotation 23 of the cam as the latter turns towards its release position and such increase in load would lead to a proportional load being placed on the means for releasing the fastening device.

To avoid such an increase in load the centre 35 about which the radiused portion 34 is formed is displaced to a small extent towards such portion with respect to the centre of rotation 23, along a line normal to the flat chordal surface 25 of the cam 22, as shown at $x$ in FIGURE 6. In this figure the degree of displacement between the centre 35 and the centre 23 has been exaggerated for the sake of clarity. As a result of this arrangement, although there is still no torque applied to the cam 22 by any force due to the pressure exerted by the peripheral door seals, such force acting substantially in the direction of the arrow F, as the cam is turned towards its uncoupled position, as shown in chain-dotted lines in FIGURE 6, an increasing moment arm $y$ is created as the point of contact between the cam and the radiused portion 34 of the keeper 21 moves along the flat chordal surface 25 of the cam. The increasing torque thus applied effectively nullifies the excessive bearing load already referred to.

As shown in FIGURE 5, when the cam 22 has turned into its coupling position there are two points of contact between the cam and the keeper 21, the first being between the roller 27 and a flat upper surface 36 of the cavity of the G shape and the second between the flat chordal surface 25 of the cam at a point very close to its centre of angular movement 23 and the radiused portion 34 of the tail of the G shape. Thus a translatory force tending to separate the cam 22 and keeper 21 passes substantially through the centre 23 with the result that substantially no torque is applied to the cam.

In the coupled position of the parts described, and as shown in FIGURE 5, further inward travel of the cam 22 can occur to an extent determined by the spacing between the leading end 24 of the cam and the vertical closed portion 37 of the cavity of the G shape, such further inward travel constituting the permissible "overtravel" provided by the fastenings.

The external surfaces **30*a*, 38*a* of the upper and lower jaws 30, 38 of the keeper 21 are adapted to engage with a guide carried by the door pillar in fixed relationship to the centre of angular movement 23 of the cam 22, such guide being a channel-like guide plate 39 outwardly flared or funnel shaped at its forward end 40 to ensure that the open end of the keeper 21** is correctly guided thereinto during the door closing operation, and thereby also ensuring that the cam is correctly engaged with the keeper.

As shown clearly in FIGURE 1, the external surfaces 30*a*, 38*a* of the upper and lower jaws 30, 38 of the keeper 21 are inclined downwardly and upwardly respectively from points 41, 42 lying on a line 43—43 passing vertically through the centre 35 of the aforesaid radiused portion 34 of the tail 33 of the G shape.

When the cam 22 is in its coupling position within the keeper 21, as shown in FIGURE 5, the roller 27 is pressed firmly against the inner surface 36 of the upper jaw 30 of the keeper 21, as a result of which the upper jaw 30 of the keeper is held tightly in a vertical sense by this contact and the contact between the point 41 on its external surface and the upper flange 44 of the guide plate 39 whereby effective vertical restraint is provided. In this connection the roller 27 is so disposed with respect to the centre of rotation 23 of the cam 22 that when the fastening device 20 is in the coupling position shown in FIGURE 5 the axis 27*a* of the roller is positioned slightly outwardly of the line 43—43 which, in this position of the fastening device, passes substantially through the centre of rotation. Thus the roller 27 is within the friction angle in which vertical pressure exerted thereon by the abutting surface 36 of the keeper does not produce a torque on the cam tending to turn it towards its uncoupling position. In order to allow a reasonable manufacturing tolerance for the various parts and ensure that the roller 27 is pressed firmly against the inner surface 36, the latter is adjustable towards and away from the centre of rotation 23. Such adjustment is effected by means of a horizontally slidable wedge 45, FIGURE 5, mounted within a tapered recess 46 formed in the upper jaw 30 of the keeper, sliding movement of the wedge to swell or release a thin lining web 47 providing the surface 36 being effected by means of an adjusting screw 48 the inner end of which projects into a tapped bore 49 in the wedge whilst its head abuts the inner end of a horizontal bore 50 formed in the upper jaw 30.

The provision of the roller 27 decreases the frictional resistance between the surface 36 and the cam 22 and thus reduces the load imposed on the means for effecting angular movement of the cam to turn the latter towards its uncoupling position and release the fastening. The free ends 51, 52 of the upper and lower jaws 30, 38 of the keeper 21 are also rounded externally so that they smoothly engage with the flared or funnel-shaped forward end 40 of the guide plate 39 to ensure correct engagement of the cam 22 with the keeper.

In the arrangement described, angular movement of the cam 22 about its centre 23 towards the coupling position is effected by spring loading the cam in an anti-clockwise direction but means are also provided whereby the cam is angularly moved in a positive manner into its coupling position owing to translatory movement of the door relatively to the keeper 11, so that in the event of failure of the spring loading means or at a velocity of door slam and consequent recoil sufficiently high to prevent recovery under the influence of the spring loading, the cam will move to its coupling position. Such means are provided by the aforesaid downwardly projecting lobe 26 of the cam 22, which, as shown in FIGURE 7, is brought into contact with an outwardly facing inclined side 53 of the tail 33 of the G shape to impart a blow to the cam, upon failure of the spring loading means, and knock the latter round into its coupling position. Should the blow be insufficient to turn the cam 22 into its coupling position, inward movement of the door pillar during its "overtravel" causes the lobe 26 of the cam to travel, as indicated in broken lines, up the inclined side 53 and turn the cam into its coupling position. In order to prevent undue wear on the radiused portion 34 and the inclined side 53 of the tail 33 of the G shape of the keeper 21, which may be manufactured from nylon, or other suitable plastic material, a lining 54 of spring steel which covers the radiused portion and inclined side is secured to the tail of the G shape.

As shown in FIGURES 8 and 9, the cam 22 is formed integrally with a large diameter base or boss 22*a*, but offset from the latter in an axial direction, such base being rigidly mounted on a flat cam plate 55 of substantially similar plan form to the base. The roller is mounted on a pivot 27*b* the ends of which are secured to the cam 22 and cam plate 55 respectively. In addition to the guide plate 39, which is only lightly indicated in FIGURE 8 for the sake of clarity, the portion of the fastening which is carried by the door pillar also comprises a backplate 56 having a portion 56*a* which is bent at right angles to the remainder of the plate and projects into the structure of the door. Clinch nuts 57, which also form spacing collars between the guide plate 39 and the backplate 56, are secured to the outer surface of the latter and enable the guide plate and backplate to be secured to each other in position on the door pillar with the sheet metal 58 of the latter sandwiched therebetween, the outer periphery of the guide plate being flanged outwardly, as shown at 39*a*, to cooperate, as already described, with the upper and lower surfaces 30*a*, 38*a* of the keeper 21. A bearing 23*a*, on which the cam 22 and cam plate 55 are rotatably mounted, is secured to the backplate 56 and forms the aforesaid centre of rotation 23 of the cam, the cam and roller 27 projecting outwardly from the backplate through a hole 59 cut in the guide plate 39 and sheet metal 58. Spring loading of the cam 22 in an anti-clockwise direction towards its coupling position is effected by means of a spiral spring 60, FIGURE 10, the centre of which is anchored to a stud 61 secured to and projecting inwardly from the backplate 56 whilst its radially projecting free end 60*a* bears on an actuating stud 62 secured to the inner face of the cam plate 55 and projecting inwardly into the interior of the door through a curved slot 63 formed in the backplate 56.

Rotation of the cam 22 against the spring loading to release the fastening device 20 is effected by means of a contactor plate 64 pivotally mounted on the stud 61 inwardly of the spiral spring 60 anchored thereon. An outwardly turned portion 65 of the contactor plate 64 presents a substantially radial surface which bears against the actuating stud 62 to rotate the cam 22 when angular movement of the contactor plate about the stud 61 occurs. Such angular movement of the contactor plate 64 is effected from outside the door by a pushbutton 66 slidably and non-rotatably mounted in a sleeve 67 secured at its inner end to the backplate 56, the pushbutton being loaded outwardly in the sleeve by means of a compression spring 67*a*, FIGURE 12. The pushbutton 66 operates a sliding pushbutton shaft 68 of elongated rectangular cross-section, inward movement of the pushbutton producing inward sliding movement of such shaft and causing a projecting shoulder 69, FIGURE 12, formed thereon to contact a step 70 formed on a projecting arm 71 of the contactor plate 64 and effect angular movement of the latter about the stud 61 on which it is mounted and consequent rotation of the cam 22.

Remote control of the fastening device 20 to release the latter is provided by a control lever 72 pivotally mounted on a stud 73 secured to the portion 56*a* of the backplate 56, the control lever having a nose portion 74 which lies below and cooperates with a projecting nose portion 75 of the contactor plate 64 to raise the nose portion 75, when the remote control lever 72, as shown in FIGURE 9, is rotated in a clockwise direction, and thus rotate the cam 22 to effect release of the fastening. A slot 76 is provided in the portion 56*a* of the backplate to accept the nose portion 75 of the contactor plate. Rotational movement of the remote control lever 72 about its pivot is effected by an internal operating arrangement, not illustrated, which may be in the form of a rotating handle, mounted on the interior of the door, and connected by a link to an upwardly projecting arm 77 of the remote control lever 72.

Means are provided for locking the fastening device 20 against release by means of the external pushbutton 66. Such means comprise a key cylinder locking device 78, FIGURE 12, incorporated in the pushbutton 66 into which a key can be inserted and turned to turn the pushbutton shaft 68 about its longitudinal axis from the position shown in FIGURES 8 to 14 to an inoperative inclined position shown in FIGURE 15. In this latter position of the pushbutton shaft 68 the shoulder 69 formed therein is displaced upwardly to a position in which it does not make contact with the step 70 on the contactor plate 64 so that angular movement of the latter about the stud 61 to effect release of the fastening device cannot be effected by inward sliding movement of the pushbutton shaft.

In order to enable locking of the fastening device 20 against release by means of the pushbutton 66 to be effected from inside the vehicle a substantially U-shaped locking lever 79, shown most clearly in FIGURE 13, is provided at the inner end of the pushbutton shaft 68, a longer upwardly projecting limb 80 of the locking lever being pivotally secured to the portion 56*a* of the backplate by a stud 81 the axis of which is substantially in alignment with the longitudinal axis of the pushbutton shaft. The shorter inner limb 82 of the locking lever 79 carries a boss 83 having a hole 84 formed axially therein to accept the end of the pushbutton shaft 68, a transverse pin 85 carried by the latter engaging with a V-shaped groove 86 formed diametrically across the end face of the boss 83. At its upper end the limb 80 of the locking lever 79 has a portion 87 turned outwardly to project through a curved slot 88 formed in the portion 56*a* of the backplate, the outwardly turned portion 87 engaging with an end face 89 of a recess 90 formed in the lower end of the remote control lever 72 when the parts are in the position shown in FIGURES 9 and 13. Movement of the remote control lever 72 about the stud 83 in an anti-clockwise direction by means of the internal operating arrangement will therefore rotate the locking lever 79 about the stud 81 in a clockwise direction in consequence of which the pushbutton shaft 68 will likewise be rotated about its longitudinal axis to the inoperative position shown in FIGURE 15, owing to the engagement of the pin 85 with the groove 86 in the boss 83, and operation of the pushbutton 66 will not effect release of the fastening.

A stop 91 formed by an inwardly-turned end of the portion 56*a* of the backplate is provided to prevent excessive movement of the remote control lever 72 towards the locking position. It will be appreciated that, when the fastening device 20 has been locked from inside the vehicle, movement of the remote control lever 72 to release the fastening device and enable the door to be opened causes the other end face 92 of the recess 90 to be brought into contact with the outwardly turned portion 87 of the locking lever 79 to turn the latter back to its original position in consequence of which the pushbutton shaft 68 is rotated about its longitudinal axis to the operative position. The purpose of the pin and groove arrangement 85, 86 is to form an overload clutch so that, should the remote control lever 72 be operated to open the door whilst the pushbutton shaft 68 is locked in its inoperative position by a portion 97 of an interacting lever 93 to be subsequently referred to, the pushbutton shaft 68 will not be strained due to the fact that the pin 85 will ride up the inclined sides of the groove 86 against the loading of the spring 67*a*.

Means are provided to prevent locking of the fastening device 20, either by means of the locking device 78 or the internal operating arrangement connected to the remote control lever 72, whilst the door of the vehicle is open. Thereby the possibility of either a driver or passengers inadvertently locking themselves out of the vehicle, for example if the keys are left within the latter, by closing the door is precluded. Such means comprise the interacting lever 93, FIGURES 8, 14 and 15, pivotally mounted on a stud 94 secured to the backplate 56 and loaded by means of a spring 95 against a stop 96 projecting from the backplate. In the position, shown in FIGURES 8 and 14, to which the interacting lever 93 is moved by the spring to make contact with the stop 96, turning movement of the pushbutton shaft 68 about its axis to its inoperative position is prevented by a portion 97 of the free end of the interacting lever which lies adjacent the surface of the backplate 56 and substantially abuts the shoulder 69 on the pushbutton shaft to prevent turning movement of the shaft.

When the vehicle door is open the interacting lever 93 is always maintained in contact with the stop 96 by the loading of the spring 95 so locking of the fastening either from inside or outside the vehicle is prevented. Upon closing the vehicle door an outwardly turned lip 98 of the interacting lever 93 comes into contact with the lower jaw 38 of the keeper 21, which as already stated is fixed to the body pillar, and the interacting lever swings about the stud 94 in the direction of the arrow in FIGURE 8 so that the portion 97 of the interacting lever moves away from the vicinity of the shoulder 69 on the pushbutton shaft 68 and is replaced by a raised stepped portion 99 which clears the outer end of the shoulder and allows the pushbutton shaft to be turned to its inoperative position either from inside or outside the vehicle. An L-shaped slot 100 is provided in the backplate 56 to allow the necessary sliding and turning movement of the shoulder 69. To prevent the entry of dust and grit into the interior of the fastening device a thin shroud 102 of nylon is provided which is apertured to fit round the flanks of the cam 22 and abuts the outer surface of the guide plate 39.

The fastening device of the invention is also readily adaptable for use with vehicle doors in which the internal locking and unlocking means comprise a knob 105, shown in broken lines in FIGURE 9, providing sill control, such knob being capable of vertical sliding movement and mounted on the horizontal sill 106 of the door panel, the lower end of the shaft 107 on which the knob 105 is mounted being connected, either directly or indirectly, to a modified form of locking lever, similar to 79. Such an arrangement affords an indication, readily visible from outside the vehicle body, as to whether the fastening device is unlocked or locked. It will be understood that in this arrangement the lever 72 will only serve for opening the door and will, therefore, be of simplified form.

For simplicity the keeper 21 may be constructed as a plate with two separate series of serrations 101, FIGURE 9, running in two directions at right angles to one another on its rear surface 21*a* so that the keeper does not slip from its position in which it is mounted on the pillar by its fixing screws. As already described, the keeper 21 may be in one piece and of substantially G shape or it may consist of two spaced cam-engaging surface portions. Such an arrangement may be employed in the case of fastenings for heavy doors, two separate cams being employed which are mounted for angular movement in opposite directions about slightly spaced centres. A single keeper in such an arrangement may serve both cams and be of substantially C shape with a separate wedge-shaped portion arranged at the centre of its cavity.

Provision may be made whereby the fastening device 20 also serves to prevent separation of the body pillar and door pillar in a direction longitudinally of the vehicle. This feature of the fastening device is of value should an accident to the vehicle produce distortion or buckling of the body of the latter with a tendency to axial displacement of the cam 22 from the keeper 21 and consequent bursting open of the door. The keeper 21 may have a recess 103 formed along the lower edge of its rear surface 21*a*, as shown in the lower portion of FIGURE 9, and the outer portion of the flange 39*a* of the guide plate 39 may be turned inwardly, as shown at 104, to form with the flange and guide plate a channel 108 which embraces the keeper to prevent relative displacement of the pillars longitudinally of the vehicle. A similar arrangement may also be provided along the upper flange of the guide plate 39.

FIGURES 16 to 19 illustrate a simplified embodiment of the invention which is less costly to manufacture than the embodiment already described. The keeper 21*b*, cam 22*a* and guide plate 39*b* are substantially as already described and interact in the same manner to retain the door in its closed position. A backplate 109, having a portion 109*a* projecting therefrom at right angles, and only lightly indicated in FIGURES 16, 18 and 19 for the sake of clarity, is also provided which is secured to the guide plate 39*b* with the sheet metal 58 of the door pillar sandwiched therebetween, and the cam 22*a* is carried by a boss 110 rotatably mounted in the guide plate and projecting into an aperture 111 formed in the backplate, a cam plate 112 being secured to the inner face of the boss. At its peripheral edge the cam plate 112 carries three upstanding lugs 113, 114, 115, which project inwardly into the structure of the door, and spring loading of the cam plate and cam 22*a* in a direction tending to turn the latter into its coupling position is effected by a torsion spring 116 located by a drum 117 and having outwardly turned ends 118, 119, the end 118 projecting through a hole 113*a* formed in the lug 113 whilst the end 119 abuts a stop 120 mounted on the backplate 109.

Direct release of the fastening device is effected, as in the previous embodiment, by a pushbutton 121, FIGURE 18, operation of which effects inward movement of a pushbutton shaft 122. The latter is connected by a link member 123 to a contactor plate 124, which may be in the form of a nylon moulding, pivotally mounted on a boss 125 projecting inwardly from the cam plate 112, the contactor plate and cam plate being coaxially arranged with respect to each other. A portion 126 of the contactor plate 124 projecting towards the cam plate 112 is formed with a radially disposed contact face 147 which coacts with a contact face 148 formed by an end face of the lug 115 on the cam plate so that rotation of the contactor plate in the direction of the arrow in FIGURE 18 by operation of the pushbutton 121 effects rotation of the cam plate and cam 22*a* to release the fastening device. Means may be incorporated in the pushbutton 121 for locking the latter against inward movement in order to prevent release of the fastening device thereby.

One end of the link member 123 is formed as a ball 127 which is mounted in a part-spherical socket 128 formed in the contactor plate 124, the ball being a rotating fit in the socket to permit a limited extent of free angular movement of the link member. The latter and the ball 127 are also formed of nylon and the angular extent to which the socket 128 surrounds the ball exceeds 180° so that the diameter of the mouth of the socket is less than the diameter of the ball. The difference in these two diameters is such as to permit the ball 127 to be forced into the socket 128 on assembly, owing to a limited degree of distortion of the resilient material from which the ball and socket are formed, and to retain the ball in position in the socket once it has been forced thereinto. A similar ball and socket joint 129 is provided at the opposite end of the link member 123 to connect it to the pushbutton shaft 122.

Remote control of the fastening device is effected by a cranked remote control lever 130 mounted on a pivot 131 secuerd to the portion 109*a* of the backplate 109, an upwardly extending arm 132 of the remote control lever being connected to the internal operating arrangement on the door. A substantially horizontal arm 133 of the remote control lever 130 is connected to the cam plate 112 by a semi-rigid strap 134, preferably of nylon, one end of which is secured to the horizontal arm by an integrally formed button 135 slidably mounted in a curved slot 136 formed in the horizontal arm whilst its opposite end passes inwardly through the gap 137 between the lugs 114, 115 on the cam plate and is retained in position by a knob 138 formed on the end of the strap. Angular movement in an anti-clockwise direction of the remote control lever 130, as shown in FIGURE 16, about the pivot 131 will therefore cause rotation of the cam plate 112 to release the fastening device. Locking of the latter from inside the vehicle by means of the internal operating arrangement is effected by turning the remote control lever 130 in the opposite direction about its pivot 131. At the free end of the substantially horizontal arm 133 the upper end thereof is turned outwardly away from the portion 109*a* of the backplate, as shown at 139, and then downwardly parallel to the remainder of the arm to form a locking limb 140 which, when the end of the arm 133 is lowered, is brought into contact with a step 141 formed in the periphery of the contactor plate 124 to prevent rotation of the latter, and consequential rotation of the cam 22*a* towards the release position, by the pushbutton 121. During locking movement of the remote control lever 130 the button 135 securing the strap 134 to the lever slides upwardly in the slot 136.

An outstanding feature of the fastening device according to the invention, which it is believed is possessed by no other fastening device, is that provided the appropriate relative translatory movement between the cam and the keeper has occurred and the door is in the closed position the device must be fully locked, regardless of the spring 60 or the action of gravity, due to the aforesaid evolution of the coacting surface portions of the two parts of the fastening device, i.e. in the embodiments illustrated the lobe 26 of the cam 22 and the inclined side 53 of the tail 33 of the G shape of the keeper.

We claim:

1. A releasable fastening device comprising first and second parts adapted for relative translatory and angular movement during a fastening operation, said first part having a lobe thereon and being pivoted about an axis lying in a plane transverse to the direction of said relative translatory movement, and said second part having a projecting portion which is adapted to engage with said lobe in an interlocking manner during the fastening operation, and means urging said first part to a resting position which corresponds to the relative coupling position of said parts, said lobe having a surface portion which coacts with an edge surface of said projecting portion substantially at said pivot axis and so that the resultant of the reaction force between said second and first parts when in a relative coupling position, due to any tendency for relative translatory movement between the parts in the reverse direction to that occurring during said fastening operation, passes substantially through said axis and hence applies substantially no torque about that axis to said first part.

2. A releasable fastening device according to claim 1, wherein said lobe engages said projecting portion, when the parts are in said relative coupling position, at a position slightly offset from said pivot axis in the direction of relative translatory movement of said first part during the fastening operation.

3. A releasable fastening device comprising first and second parts adapted for relative translatory and angular movement during a fastening operation, said first part being pivoted about an axis and having a lobe offset from said axis, said second part having a projecting portion which is adapted to engage with said lobe in an interlocking manner during the fastening operation, and said lobe having a surface portion on its side adjacent said axis which coacts with an edge surface of said projecting portion substantially at said pivot axis and so that the resultant of the reaction force between said second and first parts when in a relative coupling position, due to any tendency for relative translatory movement between the parts in the reverse direction to that occurring during said fastening operation, is so directed that it produces substantially no torque about said axis tending to turn said first part in a direction opposite to that in which it turns during said fastening operation, and means urging said first part to said relative coupling position which is also the resting position of said first part.

4. A releasable fastening device comprising first and second parts adapted for relative translatory and angular movement during a fastening operation, said first part being pivoted about an axis and having a lobe offset from said axis, and said second part having a projecting portion which is adapted to engage with said lobe in an interlocking manner during the fastening operation, spring means tending to turn said first part about said axis in a positive interlocking direction towards a coupling position, and means to oppose said spring means as said first and second parts interengage to guide said lobe into engagement with said projecting portion, said lobe having a surface portion which coacts with an edge surface of said projecting portion substantially at said pivot axis and so that the resultant of the reaction force between said second and first parts when in said coupling position, due to any tendency for relative translatory movement between the parts in the reverse direction to that occurring during said fastening operation, is so directed that it produces substantially no torque about said axis tending to turn said first part in a direction opposite to said positive interlocking direction.

5. A releasable fastening device comprising two generally plate-like parts between which relative translatory movement occurs during the fastening operation, means to produce relative angular movement of said parts as a result of said relative translatory movement, and said parts having edge portions the evolution of which is such that as a result of coaction between said edge portions substantially at the centre of said angular movement the latter is irreversible, when it has proceeded beyond a certain point, by relative translatory movement between the parts in the reverse direction.

6. A releasable fastening device according to claim 5, wherein said means to produce relative angular movement comprise a spring loading one of said parts into a coupling position relatively to the other of said parts, and said parts have further edge portions which are so relatively formed as to coact at the commencement of the fastening operation to oppose said spring and produce relative angular movement of said parts whereby to guide the latter into engagement.

7. A releasable fastening device comprising a generally plate-like cam and a generally plate-like keeper between which relative translatory movement occurs during the fastening operation, said cam and keeper being adapted for interlocking engagement, means to produce relative angular movement of said cam and keeper as a result of said relative translatory movement, and said cam and keeper having edge portions the evolution of which is such that as a result of coaction between said edge portions substantially at the centre of said angular movement the latter is irreversible, when it has proceeded beyond a certain point, by relative translatory movement between the parts in the reverse direction.

8. A releasable fastening device according to claim 7, wherein means are provided for releasing said cam and keeper from a relative coupling position directly and by remote control, such means operating to effect positive angular movement of said cam in the reverse direction to its movement to said coupling position.

9. A releasable fastening device according to claim 7, wherein a guide is provided which undergoes translatory movement with said cam and coacts with said keeper to ensure correct engagement of said cam and keeper during the fastening operation.

10. A releasable fastening device comprising a generally plate-like cam and a generally plate-like keeper between which relative translatory movement occurs during the fastening operation, said cam and keeper being adapted for interlocking engagement, means to produce relative angular movement of said cam and keeper as a result of said relative translatory movement, said cam and keeper having edge portions the evolution of which is such that as a result of coaction between said edge portions substantially at the centre of said angular movement the latter is irreversible, when it has proceeded beyond a certain point, by relative translatory movement between the parts in the reverse direction, and said keeper having two further spaced edge portions one of which coacts with the cam during initial contact of said cam and keeper to produce relative angular movement between the cam and keeper in a direction opposite from that which occurs as the cam and keeper move into a relative coupling position so that the former is guided into a space defined between said two further edge portions and said first-mentioned edge portion, while the other is subsequently engaged by the cam to provide a "safety lock" condition when full lock engagement of the parts is not achieved.

11. A releasable fastening device comprising a substantially plate-like and rotatably mounted cam, a substantially plate-like keeper adapted for interlocking engagement with said cam, said cam and keeper being adapted for substantially coplanar relative translatory movement and consequential relative angular movement during a fastening operation, said keeper having a projecting portion over which said cam rides during said fastening operation into a coupling position relatively to said keeper in which it engages therewith substantially at the centre of said relative angular movement, and said cam having a leading edge portion which cooperates with an edge of said projecting portion so that the resultant of the reaction force between said keeper and said cam when in said coupling position, as a result of any tendency for reverse relative translatory movement therebetween, produces no torque tending to rotate said cam in a direction opposite to that in which it turns into said coupling position.

12. A releasable fastening device comprising a substantially plate-like and rotatably mounted cam, a substantially plate-like keeper adapted for interlocking engagement with said cam, said cam and keeper being adapted for substantially coplanar relative translatory movement, in a plane normal to an axis about which said cam is rotatably mounted, during a fastening operation, means to produce relative angular movement of said cam and keeper in a positive interlocking direction as a result of said translatory movement, said keeper having a convex edge portion over which said cam rides during said fastening operation into a coupling position relatively to said keeper in which it engages therewith substantially at the centre of said relative angular movement, and said cam having a leading edge portion which cooperates with said convex edge portion so that the resultant of the reaction force between said keeper and said cam when in said coupling position, as a result of any tendency for reverse relative translatory movement therebetween, passes substantially through said axis and hence produces no torque tending to rotate said cam in the opposite direction from said positive interlocking direction.

13. A releasable fastening device according to claim 12, wherein said edge portions contact each other at a position slightly offset from said centre in the direction of relative translatory movement of said cam during a fastening operation.

14. A releasable fastening device comprising a substantially plate-like and rotatably mounted cam, a substantially plate-like keeper adapted for interlocking engagement with said cam, said cam and keeper being adapted for substantially coplanar relative translatory movement during a fastening operation, said keeper having a projecting portion over which said cam rides during said fastening operation into a coupling position relatively to said keeper in which it engages therewith substantially at its own centre of rotation, spring means tending to rotate said cam in a positive interlocking direction, and means to oppose said spring means as said cam and keeper interengage to guide said cam into engagement with said projecting portion, said cam having a leading edge portion which cooperates with an edge of said projecting portion so that the resultant of the reaction force between said keeper and said cam when in said coupling position, as a result of any tendency for reverse translatory movement therebetween, produces no torque tending to rotate said cam in the opposite direction from said positive interlocking direction.

15. A releasable fastening device according to claim 14, wherein said means to oppose said spring means comprise a roller rotatably mounted on said cam and adapted to engage with a further edge portion of said keeper during an initial stage of the fastening operation.

16. A releasable fastening device comprising a generally plate-like cam and a generally plate-like keeper between which relative translatory and angular movement occurs during the fastening operation, said cam and keeper being adapted for interlocking engagement in a relative coupling position substantially at the centre of said relative angular movement, said cam and keeper having edge portions the evolution of which is such that as a result of coaction between said edge portions said angular movement is irreversible, when it has proceeded beyond a certain point, by relative translatory movement between said cam and keeper in the reverse direction, and means for releasing said cam and keeper from said relative coupling position directly and by remote control, such means operating to effect positive angular movement of said cam in the reverse direction to its movement to the coupling position.

17. A releasable fastening device comprising a generally plate-like cam and a generally plate-like keeper between which relative translatory movement occurs during the fastening operation, said cam and keeper being adapted for interlocking engagement, means to produce relative angular movement of said cam and keeper as a result of said relative translatory movement, said cam and keeper having edge portions the evolution of which is such that as a result of coaction between said edge portions substantially at the centre of said angular movement the latter is irreversible, when it has proceeded beyond a certain point, by relative translatory movement between the parts in the reverse direction, said keeper having two further spaced edge portions forming parts of a continuous surface of the keeper which is shaped substantially in the form of a G with said first-mentioned edge portion formed on one limb of the G and both said further edge portions formed on the opposite limb of the G, one of said further edge portions coacting with the cam during initial contact of said cam and keeper to produce relative angular movement between the cam and keeper in a direction opposite from that which occurs as the cam and keeper move into a relative coupling position so that the former is guided into a space defined between said two further edge portions and said first-mentioned edge portion, while the other is subsequently engaged by the cam to provide a "safety lock" condition when full lock engagement of the parts is not achieved.

18. A releasable fastening device comprising a substantially plate-like and rotatably mounted cam, a substantially plate-like G-shaped keeper adapted for interlocking engagement with said cam, said cam and keeper being adapted for substantially coplanar relative translatory movement and consequential relative angular movement during a fastening operation, said keeper having opposed upper and lower limbs one of which has an inward bulge at the open end of the keeper and the other of which has an inner face formed with a projecting portion, said cam having a protruding lobe towards the trailing end of the cam and a leading edge portion presenting a substantially flat chordal surface, the arrangement being such that during the fastening operation the lobe makes initial contact with said bulge to rotate the cam in the uncoupling direction in order to guide the leading end of the cam into the mouth of the G shape, a "safety lock" condition being provided by engagement of the trailing end of said cam lobe with the inner face of said bulge whilst said cam rests on said projecting portion of the keeper with its substantially flat chordal surface in contact therewith at a point disposed forwardly of said center, thereafter the cam riding over said projecting portion into a coupling position relatively to said keeper in which it engages therewith substantially at the center of said relative angular movement, said leading edge portion cooperating with an edge of said projecting portion so that the resultant of the reaction force between said keeper and said cam when in said coupling position, as a result of any tendency for reverse relative translatory movement therebetween, produces no torque tending to rotate said cam in a direction opposite to that in which it turns into said coupling position.

19. A releasable fastening device comprising a generally plate-like cam and a generally plate-like keeper between which relative translatory and angular movement occurs during the fastening operation, said cam and keeper being adapted for interlocking engagement in a relative coupling position substantially at the centre of said relative angular movement, said cam and keeper having edge portions the evolution of which is such that as a result of coaction between said edge portions said angular movement is irreversible, when it has proceeded beyond a certain point, by relative translatory movement between said cam and keeper in the reverse direction, and means for releasing said cam and keeper from said relative coupling position directly and by remote control, such means operating to effect positive angular movement of said cam in the reverse direction to its movement to the coupling position and comprising a member adapted to be moved to an inoperative position to lock the fastening device against direct release by such means, restraining means being provided which automatically restrain said member against displacement from an operative position to said inoperative position when said cam and keeper are separated from one another, said restraining means being automatically rendered ineffective as said cam enters into engagement with said keeper whereupon locking of the fastening device is permitted.

20. A releasable fastening device comprising a generally plate-like cam and a generally plate-like keeper between which relative translatory and angular movement occurs during the fastening operation, said cam and keeper being adapted for interlocking engagement in a relative coupling position substantially at the centre of said relative angular movement, said cam and keeper having edge portions the evolution of which is such that as a result of coaction between said edge portions said angular movement is irreversible, when it has proceeded beyond a certain point, by relative translatory movement between said cam and keeper in the reverse direction, and means for releasing said cam and keeper from said relative coupling position directly and by remote control, such means operating to effect positive angular movement of said cam in the reverse direction to its movement to the coupling position and the direct release means comprising a pushbutton, a shaft connected to said pushbutton and operatively associated with said cam by means of a projection formed on the shaft, and a key cylinder locking device mounted in the pushbutton, said shaft being capable of being turned about its longitudinal axis, by means of a key inserted in said cylinder, to an inoperative position in which said projection is displaced from operative association with said cam, and the remote control means being interconnected with said shaft in such manner that the latter can be turned about its longitudinal axis by operation of such means to effect locking and unlocking of the fastening device.

References Cited in the file of this patent

UNITED STATES PATENTS

| | | |
|---|---|---|
| 2,218,183 | Springer | Oct. 15, 1940 |
| 2,246,786 | Dall | June 24, 1941 |
| 2,674,483 | De Vito | Apr. 6, 1954 |
| 2,683,050 | Allen | July 6, 1954 |
| 2,814,193 | Roethel | Nov. 26, 1957 |
| 2,863,688 | Endter | Dec. 9, 1958 |

FOREIGN PATENTS

| | | |
|---|---|---|
| 740,577 | Germany | Oct. 23, 1943 |